United States Patent [19]

Durlach

[11] 4,232,054
[45] Nov. 4, 1980

[54] INGESTABLE COMPOSITION CONSISTING OF A METALLIC NATURAL PROTEINATE AND NUTRITIVE FIBERS

[75] Inventor: Jean P. Durlach, Paris, France

[73] Assignee: Cooperation Pharmaceutique Francaise, France

[21] Appl. No.: 3,986

[22] Filed: Jan. 16, 1979

[30] Foreign Application Priority Data

Jan. 18, 1978 [FR] France ................. 78 01402

[51] Int. Cl.$^2$ ............... A23L 1/10; A21D 13/02
[52] U.S. Cl. ................... 426/618; 426/656; 426/657; 426/549
[58] Field of Search ........... 426/74, 580, 615, 618, 426/656, 657, 549

[56] References Cited

U.S. PATENT DOCUMENTS

| | | | |
|---|---|---|---|
| 1,182,671 | 5/1916 | Fowler, Jr. | 426/580 |
| 1,923,684 | 8/1933 | Perky | 426/618 |
| 2,198,218 | 4/1940 | Musher | 426/580 X |
| 3,969,540 | 7/1976 | Jensen | 426/657 |

FOREIGN PATENT DOCUMENTS 995427 3/1945 France .
987174 3/1965 United Kingdom .
1060071 2/1967 United Kingdom .

OTHER PUBLICATIONS

Hlynka I., "Wheat Chemistry and Technology", Amr. Assc. of Cereal Chemists, Inc., St. Paul, Minn., 1964, pp. 79–83.

*Primary Examiner*—Robert A. Yoncoskie
*Attorney, Agent, or Firm*—Bacon & Thomas

[57] ABSTRACT

The invention relates to an ingestable composition comprising a nutritive vegetable fiber such as wheat bran associated to a metallic natural proteinate such as calcium caseinate. Such a composition can be used in the preparation of any dietetic food product and in particular in the preparation of biscuits. Its ingestion has the same beneficial effects as that of nutritive fibers, but it eliminates the undesirable effects of protein and mineral losses.

9 Claims, No Drawings

INGESTABLE COMPOSITION CONSISTING OF A METALLIC NATURAL PROTEINATE AND NUTRITIVE FIBERS

A deficiency of vegetable fibers in food diets in western countries is one of the factors at the origin of civilization diseases. It conditions all or part of the following digestive or general disorders: simple constipation or constipation involving colitis, diverticulosis, polyposis, hiatal hernia, gastroduodenal ulcers, cholelithiasis, hemorrhoids, varicose veins in the lower limbs, obesity, sugar diabetes, atheromatosis, etc.

This dietetic deficiency having been fully realized, it is now strongly recommended to enrich the food diet with vegetable fibers, and in particular with cereal fibers: the fact that they contain more polysaccharides than lignin making them indeed more useful than the vegetable or fruit nutritive fibers. Thus, the quantity and viscosity of the stools are increased, the intra-intestinal and intra-abdominal pressures are reduced, the metabolism of the bile salts is improved, and the absorption of glucides and lipids is slowed down and reduced.

But, these favorable actions are regretfully coupled with undesirable side effects, of which the major ones are protein and mineral spoliations.

If taking into consideration, the results given by the fiber contents in a food ration, it is possible to oppose the useful reduction of the sugar and fat absorption of a nutrition with a harmful glucidolipidic overload, to the unfavorable consequences of an increased nitrogen-containing elimination which is protein-despoiling.

The demineralization mechanism has for a long time been attributed to the chelating power of the phytic acid in the fibers, which acid captures calcium, magnesium, iron, zinc, etc. Unfortunately, the dephytinizing does not eliminate all reduction in the availability of the metals and it is the fibers which really condition the mineral spoliation (J. G. REINHOLD et al.; Nutr. Rep. Inst. 1975, 12,2, 75–85).

It is the aim of the invention to retain the qualities of an increased ingesta of nutritive fibers without exposure to protein and mineral losses.

It has been found according to the invention that by combining a natural metallic proteinate with vegetable nutritive fibers, it was possible to retain the favorable effects of the fiber content, such as the effect on the passage of the bowels' content and on the glucido-lipidic metabolisms, without observing its undesirable effects on proteins and mineral elements.

The object of the invention is therefore an ingestable composition comprising the combination of a vegetable fiber, preferably a cereal fiber (such as wheat bran) with a metallic salt, (such as a calcium, magnesium, iron, zinc, cobalt or other salt) of a natural protein (such as a milk or egg protein).

It is possible for example to use a Ca, Mg, Fe, Zn, Co, or other caseinate. It is mainly the combinations with calcium caseinate that have been studied. Said caseinate can contain between 1 and 2% of calcium, but the more acid it is, the less soluble it becomes: the Ca caseinate containing 1.7% calcium has proved the easiest to manage and the one bringing optimum gustative qualities.

Using the stable balance method, with a 67 year-old male patient suffering from chronic constipation, it was found that the metabolic ratios of calcium and magnesium which were balanced before any treatment, became, after one month of an additional intake of fibers (21 g in three doses per day, of wheat bran) negative ($-17\%$ for the metabolic ratio of calcium and $-23\%$ for the metabolic ratio of magnesium). It was possible by adding to the same doses of bran, 12 g per day, in three doses, of calcium caseinate containing 1.7% calcium to restore not only a balanced metabolic ratio of calcium ($+7\%$), but also a balanced metabolic ratio of magnesium ($+2\%$). During these experiments, the calculation by tables of the calcium and magnesium intake with the food ration has shown that it had remained constantly sufficient.

It was thus found that to add to the wheat bran approximately 50% of calcium caseinate was virtually to saturate its metal-fixing properties, since not only the loss in calcium was corrected but also the loss in magnesium.

The practical difficulty of using the balance method had led to checking the activity of the combination according to the invention in a number of significant cases, by watching clinical and blood parameters in a wider range of population.

The examination has covered 54 adults: 39 women (average age: 41, age limits: 16 and 83), and 15 men (average age: 49, age limits: 29 and 77). They were systematically watched: the general condition, any digestive and neuromuscular signals, the blood pressure and the weight, and the following blood parameters: glycemia, total protides, uricemia, total lipids, triglycerides, cholesterol and (by atomic absorption spectrophotometry) the plasmatic and erythrocytary Ca, Mg and Zn, and finally the normal iron content in the blood, first before any treatment, and then each month. The subjects were given a supplementary dose of large wheat bran, depending on the rate of passage from their bowels' contents (about 12 g; limit doses 3 g and 24 g), and this for one month. The following month this extra dose was replaced by an equal intake of bran, in bread stick form, containing each 1 g of the same bran and having the formula:

Wheat bran—43%
Ca caseinate containing 1.7% calcium—20%
Cereal flour—35%
Sodium chloride—2%

The intake of raw bran during the first month did, in most cases, shorten the passage of the bowels' content and increase the volume of the stools.

Only in a minority of cases (9 patients under observations averaging 67 yeas of age, 6 women and 3 men) did it lower the protidemia by more than 5 g per liter; it lowered the erythrocytary calcemia and magnesemia respectively in 11 cases (7 women and 4 men) and in 17 cases (11 women and 6 men) all of whom actually showed beforehand a positive Chvostek sign; it only altered the normal iron content in the blood of two older patients.

Zincemia appeared, in that series, as frequently lowered (17 cases) before any adminstration of bran.

Three patients showed signs of a dyslipemia, in one of them associated to an unstable diabetes. A significant reduction of the triglycerides was noted in all three cases, with, in the diabetic patient, a normalization of the glycemia, without his diet being in any way changed.

After one month during which the caseinate-fibers composition according to the invention was substituted for the raw bran, a new check revealed, first, that the favorable effects due to the bran were maintained: the same control of the passage of the bowels' content and same glucidolipidic effects; and second, a regression of the side effects noted with the raw bran: a return to normal of the protidemia in 8 out of the 9 cases under observations, a return to the rates of erythrocytary zinc, magnesium and calcium observed before treatment, and normalization of the iron content in the blood in the two cases where it had gone down.

The ingestion of a metallic proteinate and nutritive fibers according to the invention has therefore some definite advantages over the ingestion of pure nutritive fibers. The invention is particularly concerned with a composition of calcium caseinate and wheat bran. The caseinate/fibers proportion may vary between 5 and 120% by weight; the optimum rate being between 50 and 60%.

All the other nutritive fibers (such as other cereal bran, bagasse, etc.) can be used and other metallic natural proteinates (of Mg, Zn, Fe, Co, etc. or a composition of several of these salts), depending on the needs and on the toxicity of the selected cation.

The composition according to the invention is suitable for any form of ingesta and can particularly enter into the composition of dietetic products, and in particular biscuits: laminated, baked or expanded biscuits, plain or fancy biscuits (iced, coated, stuffed etc. . . )

I claim:

1. An ingestible composition comprising a nutritive cereal fiber and a natural metallic proteinate in the proportion by weight of approximately 5 to 120 parts proteinate for 100 parts fiber.

2. The composition of claim 1 wherein the cereal fiber is wheat bran.

3. The composition of claims 1 or 2 wherein the metallic proteinate is a member selected from the group consisting of calcium proteinate, magnesium proteinate, iron proteinate, zinc proteinate, cobalt proteinate and mixtures thereof.

4. The composition of claims 1 or 2 wherein the metallic proteinate is calcium caseinate containing approximately 1% to 2% calcium.

5. The composition of claims 1 or 2 wherein the metallic proteinate is a metallic caseinate in the proportion by weight of approximately 50 to 60 parts caseinate for 100 parts fiber.

6. The composition of claims 1 or 2 wherein the natural metallic proteinate is derived from egg protein.

7. The composition of claims 1 or 2 wherein the natural metallic proteinate is derived from milk protein.

8. A dietetic food product comprising by weight approximately 43% wheat bran, 20% calcium caseinate containing about 1.7% calcium, with the balance being cereal flour.

9. The food product of claim 8 further including approximately 2% sodium chloride.

* * * * *